(12) United States Patent
Schneider et al.

(10) Patent No.: US 6,575,022 B1
(45) Date of Patent: Jun. 10, 2003

(54) ENGINE CRANKCASE GAS BLOW-BY SENSOR

(75) Inventors: Matthew L. Schneider, Seymour, IN (US); Abhay P. Bhagwat, Seymour, IN (US); Alfred Schuppe, Columbus, IN (US); George M. Kuhns, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 1302 days.

(21) Appl. No.: 09/105,124

(22) Filed: Jun. 24, 1998

Related U.S. Application Data

(63) Continuation of application No. 08/816,274, filed on Mar. 13, 1997, now abandoned, which is a continuation-in-part of application No. 08/564,429, filed on Nov. 29, 1995, now Pat. No. 5,686,868.

(51) Int. Cl.[7] ............................ G01M 19/00; G01P 5/00
(52) U.S. Cl. ............................................. 73/118.2
(58) Field of Search .............................. 73/116, 117.2, 73/117.3, 118.1, 118.2, 861.63

(56) References Cited

U.S. PATENT DOCUMENTS

| | | | | |
|---|---|---|---|---|
| 3,251,226 A | * | 5/1966 | Cushing | 73/861.63 |
| 3,445,335 A | * | 5/1969 | Gluntz | 73/116 |
| 3,667,494 A | * | 6/1972 | Haase | 73/861.63 |
| 3,724,503 A | * | 4/1973 | Cooke | 73/861.63 |
| 4,056,085 A | * | 11/1977 | Nowroski et al. | 73/118.1 |
| 4,345,573 A | | 8/1982 | Obata | 123/572 |
| 4,381,668 A | | 5/1983 | Sato et al. | 73/202 |
| 5,048,327 A | * | 9/1991 | Atwood | 73/118.2 |
| 5,199,306 A | | 4/1993 | Hunter | 73/861.63 |
| 5,234,021 A | * | 8/1993 | Kozlak et al. | 73/861.63 |
| 5,604,441 A | | 2/1997 | Freese et al. | 324/663 |
| 5,611,204 A | * | 3/1997 | Radovanovic et al. | 60/605.2 |

* cited by examiner

*Primary Examiner*—William Oen
(74) *Attorney, Agent, or Firm*—Woodard, Emhardt, Naughton Moriarty & McNett LLP

(57) ABSTRACT

An engine crankcase gas blow-by sensor. In a closed crankcase ventilation system, crankcase gases are caused to flow through a venturi which includes high pressure and low pressure taps. The high and low pressure taps are coupled to a differential pressure transducer which produces an output that is proportional to the volumetric flow of crankcase gases through the venturi. The use of a venturi in conjunction with a differential pressure sensor offers a low resistance path for the flow of crankcase gases and allows continuous monitoring of blow-by without exceeding the operating pressure limitations of various oil seals. Such a sensor is particularly suited for closed crankcase ventilation (ccv) systems, as it doesn't require venting of crankcase gases to the atmosphere, but works well in open crankcase ventilation systems also.

16 Claims, 5 Drawing Sheets

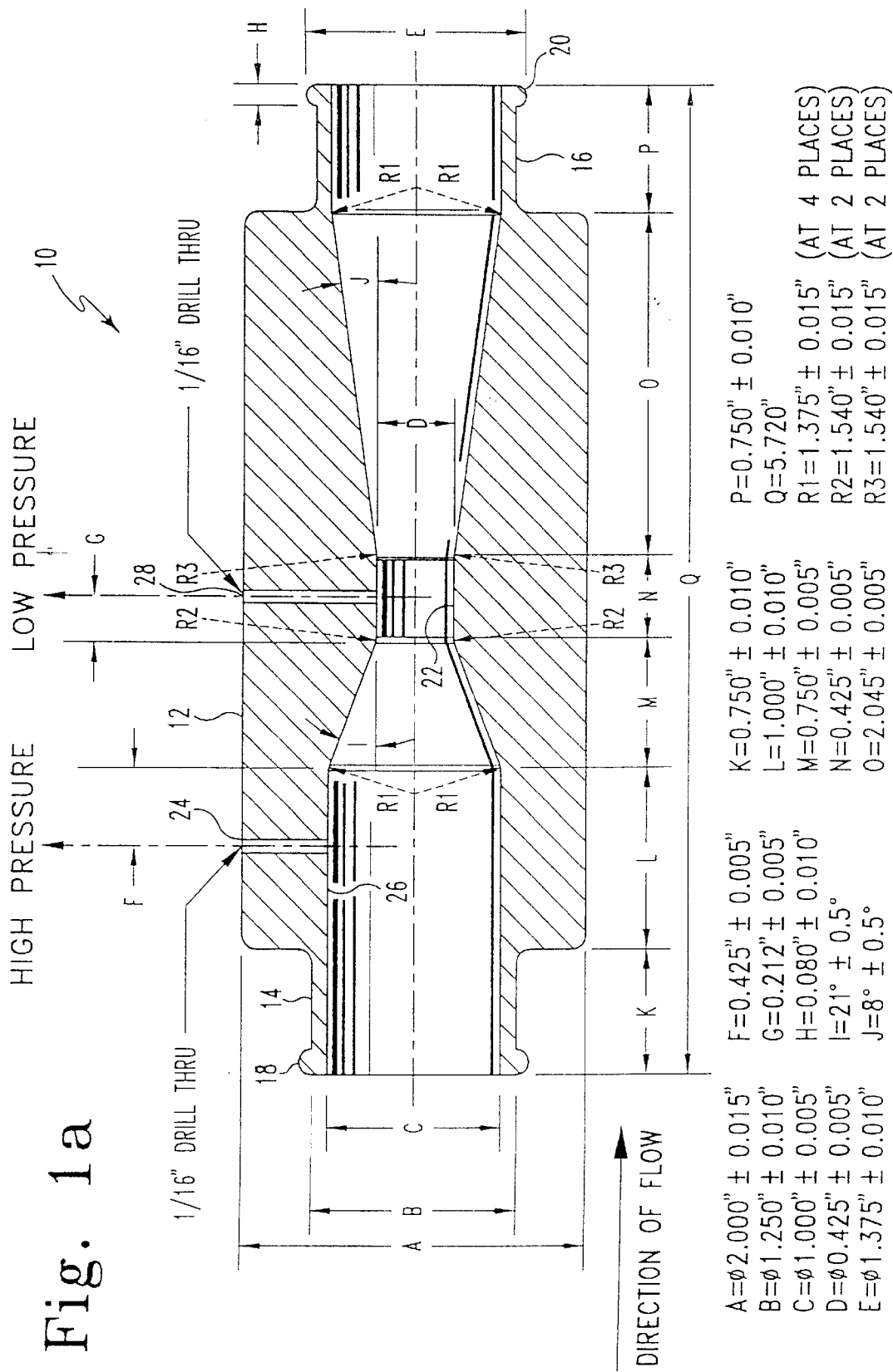

ENGINE CRANKCASE GAS BLOW-BY SENSOR

CROSS-REFERENCE TO RELATED APPLICATIONS

This application is a continuation of U.S. patent application Ser. No. 08/816,274, Mar. 13, 1997 (now abandoned, which is a continuation-in-part of U.S. patent application Ser. No. 08/564,429, filed Nov. 29, 1995 now U.S. Pat. No. 5,686,868.

TECHNICAL FIELD OF THE INVENTION

The present invention relates generally to engine crankcase gas blow-by sensors and, more particularly, to an engine crankcase gas blow-by sensor using a venturi and a differential pressure transducer to measure volumetric flow of blow-by gases.

BACKGROUND OF THE INVENTION

Ideally, the pressure within an internal combustion engine crankcase should be maintained at a level equal to or slightly less than atmospheric pressure to prevent external oil leakage through the various gasketed joints, such as that between the valve cover and the cylinder head. As is well known, in an internal combustion engine, a so-called blow-by gas is emitted in the crankcase as a result of leaks of intake air-fuel mixture and combustion gases through the clearances around piston rings, during the compression, combustion and/or exhaust cycles. Because of these blow-by gases, the crankcase pressure will inherently rise, promoting leakage of oil from the crankcase. Originally, the crankcase pressure was vented to the atmosphere through a breather in order to solve this problem.

More recently, environmental considerations have dictated that the blow-by gases in the crankcase be vented back to the combustion chamber rather than being released to the atmosphere. Such closed crankcase ventilation (CCV) systems recycle the blow-by gas by burning these gases together with the intake air-fuel mixture.

Heavy duty and high horsepower internal combustion engines run under severe and sometimes adverse conditions, where engine downtime is expensive and service is not always available. A good method of checking an engine's "health" is to periodically, or preferably continuously, monitor the flow of crankcase blow-by gases. The greater the quantity of blow-by gases escaping around the pistons, the poorer the condition of the engine. Therefore, sensing of the amount of blow-by gas in an engine can detect catastrophic failures (i.e. an instantaneous increase in the amount of blow-by gas) or monitor engine wear over time in order to predict when the engine will require an overhaul (i.e. a slowly increasing amount of blow-by gas).

A good way to measure the volume of blow-by gas entering the crankcase is to measure the pressure of such gases in the crankcase. However, closed crankcase ventilation systems do not allow any of the crankcase gases to be vented through an orifice, which would be required in order to measure the crankcase pressure. There is therefore a need for an alternative way to measure the amount of blow-by gas entering the engine crankcase and to collect this data for making determinations of engine health. The present invention is directed toward meeting this need.

SUMMARY OF THE INVENTION

The present invention relates to an engine crankcase gas blow-by sensor. In a closed crankcase ventilation system, crankcase gases are caused to flow through a venturi which includes high pressure and low pressure taps. The high and low pressure taps are coupled to a differential pressure transducer which produces an output that is proportional to the volumetric flow of crankcase gases through the venturi. The use of a venturi in conjunction with a differential pressure sensor offers a low resistance path for the flow of crankcase gases and allows continuous monitoring of blow-by without exceeding the operating pressure limitations of various oil seals. Such a sensor is particularly suited for closed crankcase ventilation (ccv) systems, as it doesn't require venting of crankcase gases to the atmosphere (but will also work well on open systems).

In one form of the invention, an internal combustion engine is disclosed, comprising at least one cylinder; at least one piston slidingly disposed within the at least one cylinder in order to define a combustion chamber above the piston; an air intake system operable to supply air to the combustion chamber; a crankcase coupled to the at least one cylinder, wherein an interior of the crankcase is in fluid communication with an interior of the at least one cylinder below the at least one piston, wherein combustion gases which blow-by the at least one piston may enter the crankcase; a venturi having an inlet port and an outlet port, wherein the inlet port is coupled to the crankcase interior and the outlet port is coupled to the air intake system such that gas within the crankcase may flow through the venturi; a high pressure tap extending from an exterior of the venturi to an interior of the venturi; a low pressure tap extending from the venturi exterior to the venturi interior; and a sensor coupled to the venturi and operative to measure a differential pressure between the high pressure tap and the low pressure tap.

In another form of the invention, an engine crankcase gas blow-by sensor is disclosed, comprising an engine crankcase operative to contain blow-by gases; an air intake system; a venturi having an inlet port and an outlet port, wherein the inlet port is coupled to an interior of the engine crankcase and the outlet port is coupled to the air intake system such that gas within the crankcase may flow through the venturi; a high pressure tap extending from an exterior of the venturi to an interior of the venturi; a low pressure tap extending from the venturi exterior to the venturi interior; and a sensor coupled to the venturi and operative to measure a differential pressure between the high pressure tap and the low pressure tap.

In another form of the invention a method of evaluating performance of an internal combustion engine is disclosed, comprising the steps of: (a) routing at least a portion of blow-by gases within a crankcase of the engine through a venturi having a high pressure tap and a low pressure tap; (b) measuring a pressure differential between the high pressure tap and the low pressure tap; and (c) outputting a signal that is proportional to the measured pressure differential.

BRIEF DESCRIPTION OF THE DRAWINGS

FIG. 1a is a cross-sectional view of a preferred embodiment of the venturi of the present invention.

DESCRIPTION OF THE PREFERRED EMBODIMENT

Figure 1B:
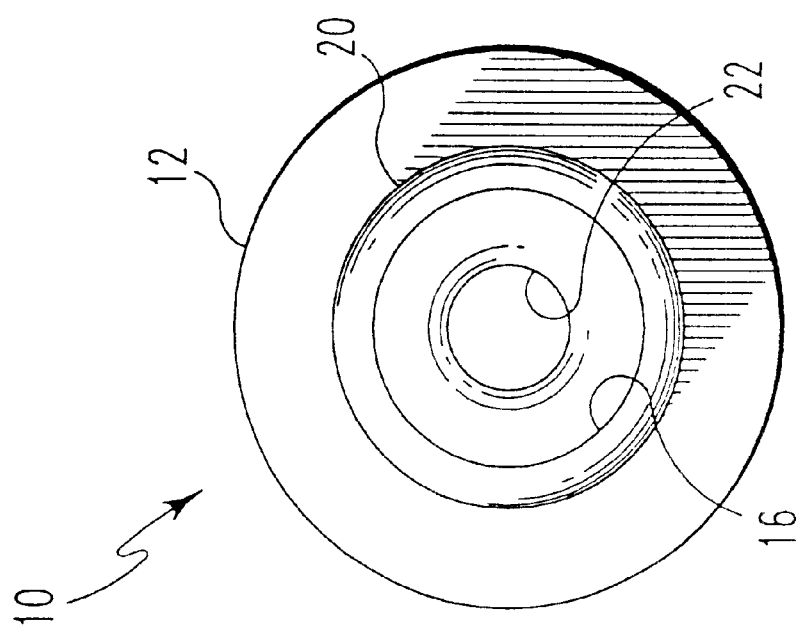
FIG. 1b is an end view of the venturi of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Hereinafter, when expressions such as "above" and "below" are used, it will be assumed that the piston is so oriented that its axis is vertical and the crankcase is positioned below the piston. This hypothesis is merely intended to simplify the description and therefore does not imply that the piston is in fact oriented in this way when it is mounted in an internal combustion engine.

The present invention involves the sensing of crankcase blow-by gases by measuring the volumetric flow of such gases rather than the prior art method of measuring the pressure of these gases. Volumetric flow of the blow-by gases is accomplished by routing a portion of these gases through a venturi which has high pressure and low pressure taps therein. A differential pressure sensor is then attached to the high and low pressure taps in order to measure the pressure differential between the taps. This differential pressure is related to the volumetric flow of blow-by gases through the venturi, and hence the volumetric flow of blow-by gases around the engine pistons. Both instantaneous measurement of this volumetric flow, as well as historical trend analysis, provide useful information in determining the health of the engine as well as to predict future needs for service. The sensor will therefore yield data suitable for trend analysis to aid diagnostics and prognostics, and can be used to avoid catastrophic failure.

Referring to FIG. 1a, a cross-sectional view of a preferred embodiment venturi of the present invention is illustrated and indicated generally at 10. The venturi 10 includes a generally cylindrical venturi body 12 having an inlet port 14 and an outlet port 16 attached thereto. The inlet port 14 includes a hose connection nipple 18 while the outlet port 16 includes a hose connection nipple 20. Crankcase gases (such as those communicated to the engine head through the engine pushtubes) may thus be routed to the venturi 10 via a suitable hose (not shown), and crankcase gases exiting the venturi 10 may be routed back to the air intake of the engine (such as an inlet of an engine turbocharger) via a second suitable hose (not shown). The venturi 10 is preferably formed from aluminum, steel or an injection molded engineering thermoplastic, or any other suitable material.

The dimensions of the venturi 10 will vary depending upon the engine size with which the venturi is associated. The dimensions given for the venturi 10 of FIG. 1a are preferred for use with a K50 diesel engine manufactured by the Cummins Engine Company of Columbus, Ind. Because the venturi effectively amplifies the flow rate of crankcase gases through the venturi, different venturi sizes will be appropriate for different size engines.

In the preferred embodiment of FIG. 1a, the venturi 10 has an inlet port 14 internal diameter of 1 inch. The outlet port 16 also has an internal diameter of 1 inch. The venturi throat 22 has an internal diameter of 0.425 inches. Dimensions for the other portions of the venturi 10 are illustrated in FIG. 1a. A high pressure tap 24 is formed from the exterior surface of the venturi body 12 to the inlet bore 26 which extends through the inlet port 14. Similarly, a low pressure tap 28 is formed from the exterior surface of the venturi body 12 to the venturi throat 22.

Figure 2:
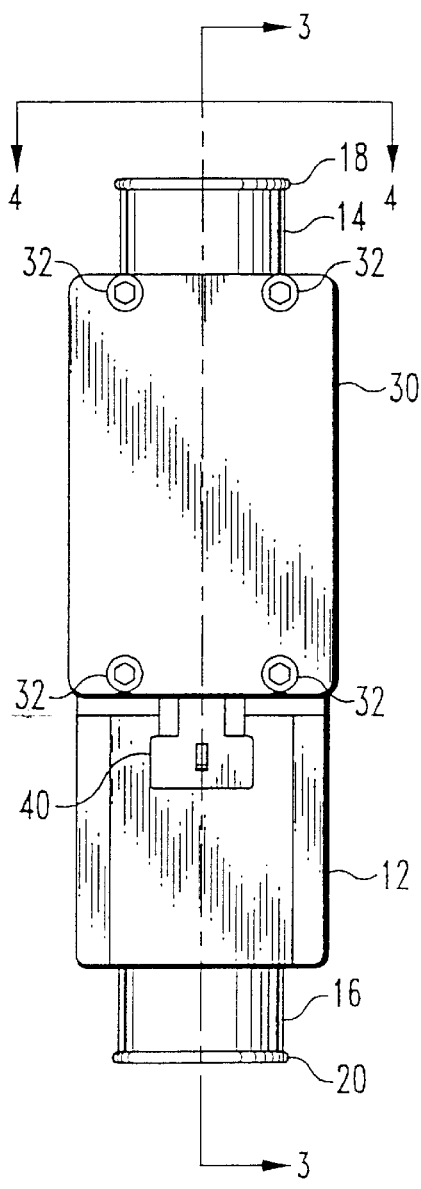
FIG. 2 is a top plan view of the venturi of FIG. 1 with the differential pressure transducer mounted thereon.

Referring to FIG. 2, a differential pressure sensor 30 is coupled to the venturi body 12 by means of four screws 32 which bore into the body 12. The differential pressure sensor 30 is preferably a variable capacitive on ceramic differential pressure sensor such as a model P604 manufactured by Kavlico of Moorepark, Calif., but any type of differential pressure sensor may be utilized in the present invention.

Figure 3:
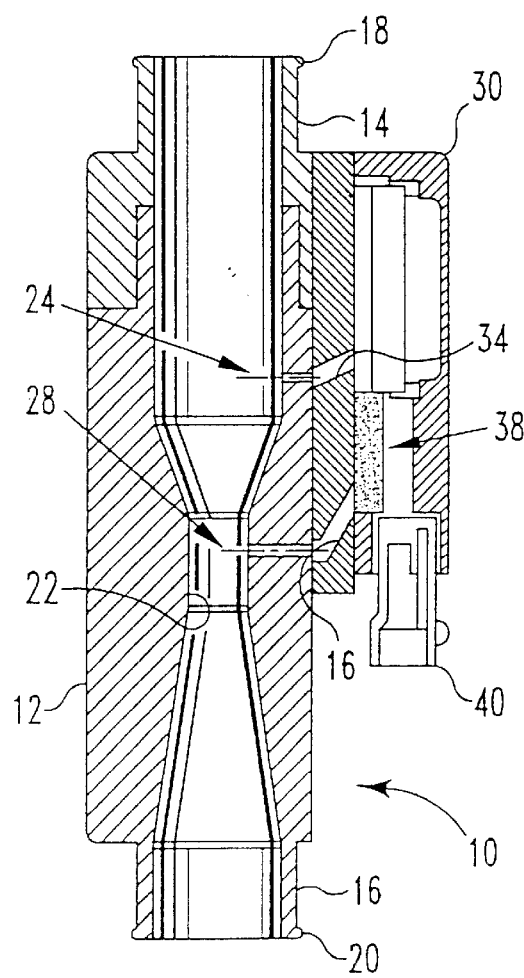
FIG. 3 is a cross-sectional view of the venturi and differential pressure sensor of FIG. 2.
Figure 4:
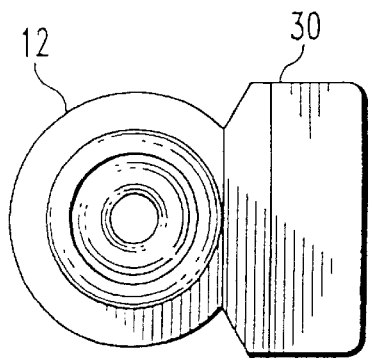
FIG. 4 is an end view of the venturi and differential pressure sensor of FIG. 2.

As illustrated in the cross-sectional view of FIG. 3, the differential pressure sensor 30 is mounted to the venturi body 12 such that the high pressure tap 24 is aligned with the inlet 34 to the high pressure side of the differential pressure sensor 30. Similarly, the low pressure tap 28 communicates with the inlet 36 of the low pressure side of the differential pressure sensor 30. The differential pressure sensor 30 is preferably of the wet-dry type, therefore the low pressure side of the sensor includes a filter element 38 in order to prevent liquid, such as uncombusted fuel and oil, to enter the low pressure side of the differential pressure sensor 30. The output of the differential pressure sensor 30 is a voltage which is proportional to the differential pressure across the high pressure tap 24 and the low pressure tap 28. This output voltage is supplied to a multi-pin electrical connector 40. The connector 40 additionally accepts the input voltage which is used to power the differential pressure sensor 30.

The venturi 10 of FIG. 1a is capable of flowing in excess of 50 actual cubic feet per minute (ACFM) air or crankcase gas, although the flow rate will be approximately 26 ACFM maximum for the model K50 engine for which the venturi 10 was designed. A flow rate of 26 ACFM results in approximately 30 inches of water pressure differential developed across the pressure taps 24 and 28.

Figure 5:
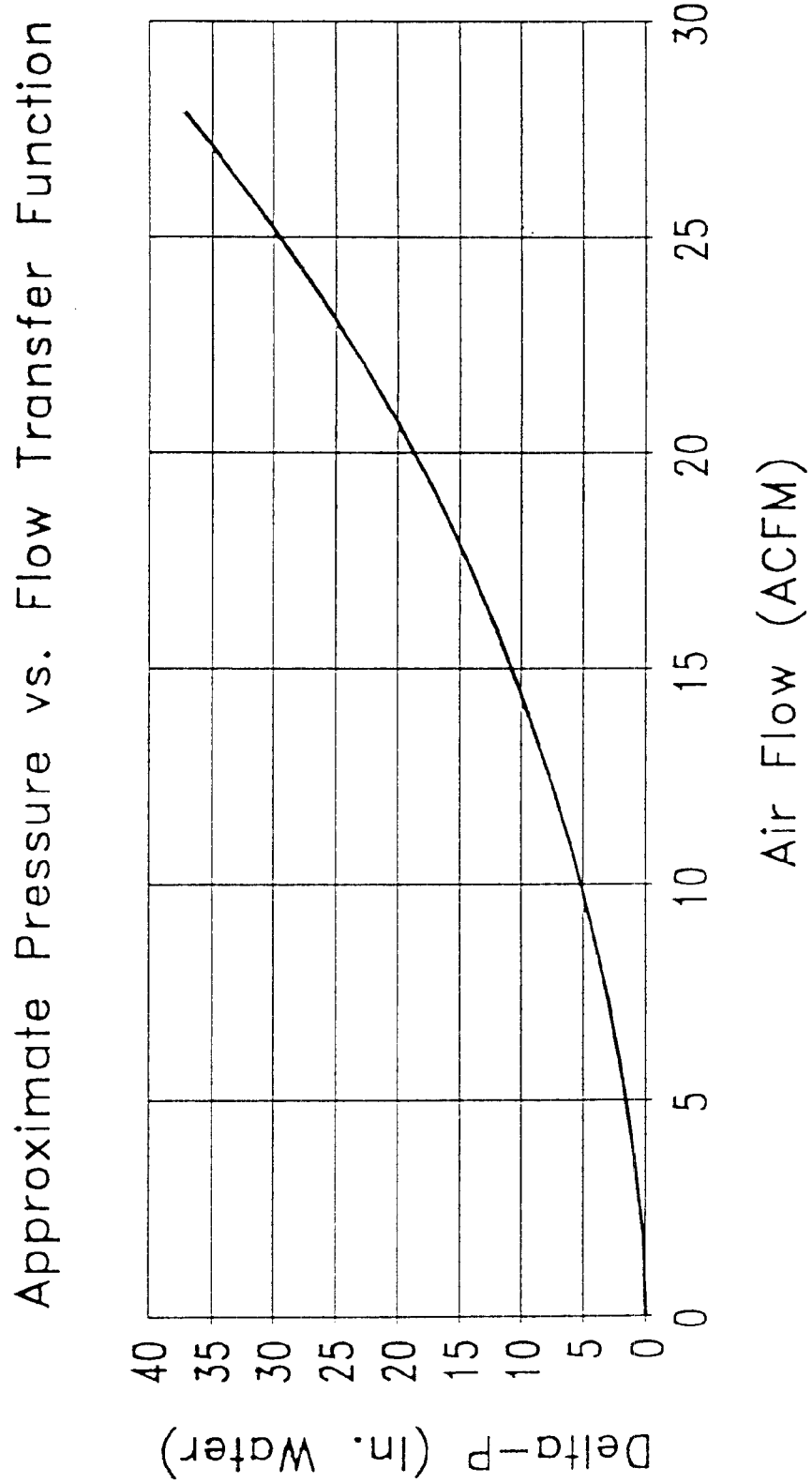
FIG. 5 is a graph of differential pressure as a function of the flow transfer function of the venturi of FIG. 2.

This is illustrated in the graph of FIG. 5 which illustrates the differential pressure developed across the pressure taps 24 and 28 of the venturi 10 as a function of gas flow through the venturi 10. This graph illustrates that the transfer function of gas flow vs. differential pressure for the venturi 10 is not linear.

The combination venturi body 12 and differential pressure sensor 30 is preferably mounted in a substantially vertical orientation in order to allow gas to run out of the venturi in order to prevent build-up and contamination within the differential pressure sensor 30. Such build-up will change the measured pressure and result in inaccuracies in the measurement of crankcase gas flow. The differential pressure sensor 30 is mounted to the venturi body 12 by means of an appropriate sealing gasket which forms an airtight seal between the differential pressure sensor 30 and the high pressure tap 24 and low pressure tap 28.

Figure 6:
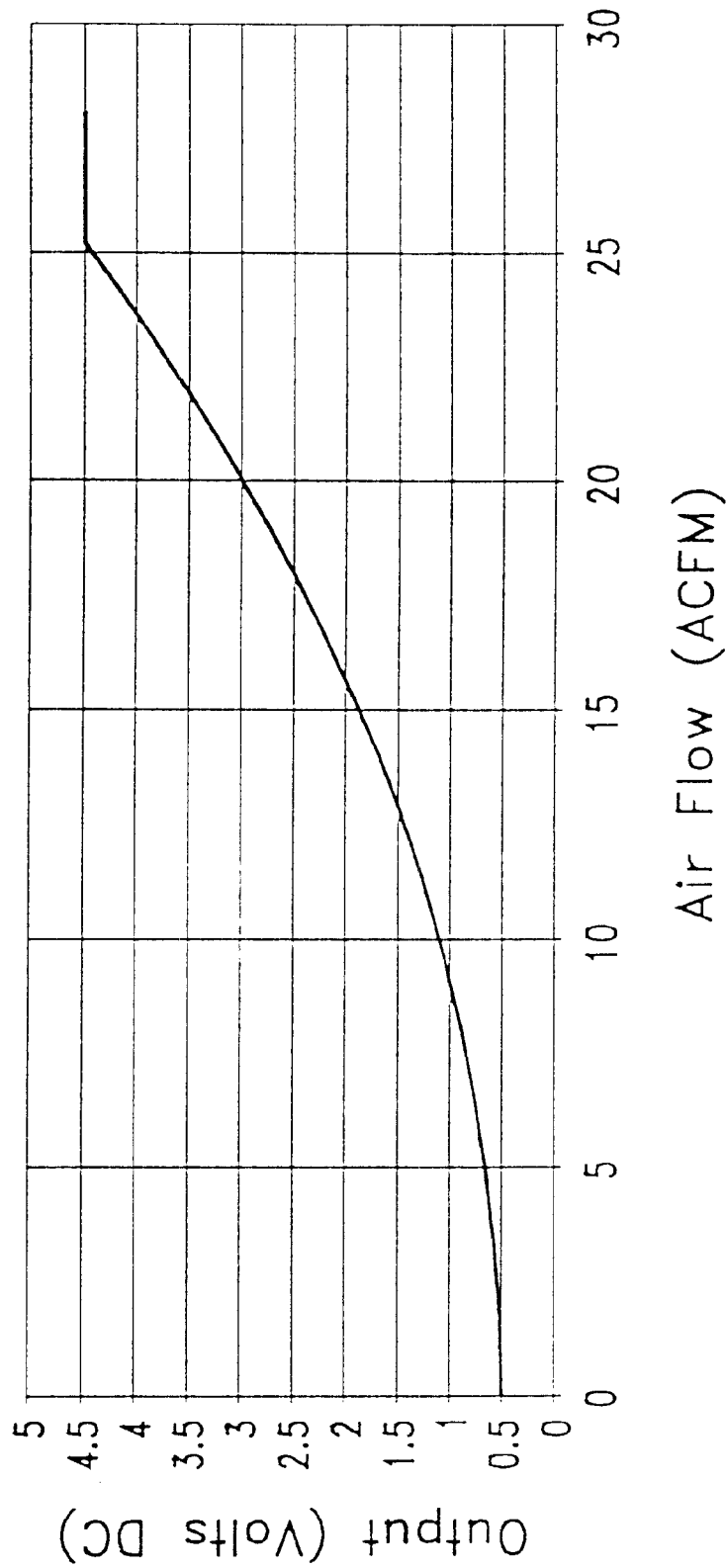
FIG. 6 is a graph of the voltage output signal of the differential pressure sensor of FIG. 2 as a function of air flow through the venturi.

Referring to FIG. 6, it can be seen that the output voltage of the differential pressure sensor 30 is a non-linear function of media volumetric flow, which tracks the actual differential pressure developed across the high and low pressure taps of the venturi. The input voltage to the differential pressure sensor 30 is 5.0+/−5% VDC. Because the sensor 30 is ratiometric to the input voltage, the output voltage illustrated in FIG. 6 assumes a 5.0 VDC input voltage. It will be appreciated by those skilled in the art that the transfer function of FIG. 6 allows an engine monitoring system to determine the flow-rate of crankcase gases through the venturi by monitoring the output voltage of the differential pressure sensor 30. This information may be used in different ways by the engine monitoring system. For instance, the output voltage of the differential pressure sensor 30 may be monitored for an instantaneous increase of blow-by gas flow, indicative of a catastrophic failure within the engine. The amount of instantaneous increase necessary to signal a catastrophic failure may be made a calibratable threshold point within the engine monitoring system and is dependent upon engine size. Upon the sensing of such an instantaneous increase in blow-by gas flow, an indicator light may be used to alert the driver of the situation. The output voltage of the differential pressure sensor 30 may also be used to record crankcase gas flow rate over time in order to chart the wear of the engine and hence predict when the engine will require an overhaul. The engine monitoring system may use a filtered linear projection in order to determine at what time the engine blow-by gases have increased to the point where maximum performance is no longer available from the engine. Appropriate servicing can then be scheduled for the vehicle prior to that time.

It will therefore be appreciated by those skilled in the art that the present invention allows useful measurement of engine crankcase blow-by which was previously unavailable in closed crankcase ventilation systems. Measurement of such blow-by gases can provide information to signal catastrophic failures within the engine as well as to predict when major engine servicing will be required in the future. Such information may be used to minimize downtime of the engine and to prevent expensive catastrophic engine failure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An internal combustion engine, comprising:
    at least one cylinder;
    at least one piston slidingly disposed within the at least one cylinder in order to define a combustion chamber above the piston;
    an air intake system operable to supply air to the combustion chamber;
    a crankcase coupled to the at least one cylinder, wherein an interior of the crankcase is in fluid communication with an interior of the at least one cylinder below the at least one piston, wherein combustion gases which blow-by the at least one piston may enter the crankcase;
    a venturi having an inlet port and an outlet port, wherein the inlet port is coupled to the crankcase interior and the outlet port is coupled to the air intake system such that gas within the crankcase may flow through the venturi;
    a high pressure tap extending from an exterior of the venturi to an interior of the venturi;
    a low pressure tap extending from the venturi exterior to the venturi interior; and
    a sensor coupled to the venturi and operative to measure a differential pressure between the high pressure tap and the low pressure tap.

2. The internal combustion engine of claim 1, wherein the high pressure tap extends from the venturi exterior to an interior of an inlet bore of the venturi.

3. The internal combustion engine of claim 1, wherein the low pressure tap extends from the venturi exterior to an interior of a venturi throat of the venturi.

4. The internal combustion engine of claim 1, wherein the sensor comprises a wet-dry differential pressure sensor.

5. The internal combustion engine of claim 1, wherein the sensor comprises a variable capacitive on ceramic pressure sensor.

6. The internal combustion engine of claim 1, wherein the venturi is mounted substantially vertically in order to allow gas to run out of the venturi.

7. An engine crankcase gas blow-by sensor, comprising:
    an engine crankcase operative to contain blow-by gases;
    an air intake system;
    a venturi having an inlet port and an outlet port, wherein the inlet port is coupled to an interior of the engine crankcase and the outlet port is coupled to the air intake system such that gas within the crankcase may flow through the venturi;
    a high pressure tap extending from an exterior of the venturi to an interior of the venturi;
    a low pressure tap extending from the venturi exterior to the venturi interior; and
    a sensor coupled to the venturi and operative to measure a differential pressure between the high pressure tap and the low pressure tap.

8. The engine crankcase gas blow-by sensor of claim 7, wherein the high pressure tap extends from the venturi exterior to an interior of an inlet bore of the venturi.

9. The engine crankcase gas blow-by sensor of claim 7, wherein the low pressure tap extends from the venturi exterior to an interior of a venturi throat of the venturi.

10. The engine crankcase gas blow-by sensor of claim 7, wherein the sensor comprises a wet-dry differential pressure sensor.

11. The engine crankcase gas blow-by sensor of claim 7, wherein the sensor comprises a variable capacitive on ceramic pressure sensor.

12. Tie engine crankcase gas blow-by sensor of claim 7, wherein the venturi is mounted substantially vertically in order to allow gas to run out of the venturi.

13. A method of evaluating performance of an internal combustion engine, comprising the steps of:
    (a) routing at least a portion of blow-by gases within a crankcase of the engine through a venturi having a high pressure tap and a low pressure tap;
    (b) measuring a pressure differential between the high pressure tap and the low pressure tap; and
    (c) outputting a signal that is proportional to the measured pressure differential.

14. The method of claim 13, wherein step (b) is performed by a wet-dry differential pressure sensor.

15. The method of claim 13, wherein step (b) is performed by a variable capacitive on ceramic pressure sensor.

16. The method of claim 13, wherein the signal is a voltage signal.

\* \* \* \* \*

UNITED STATES PATENT AND TRADEMARK OFFICE
CERTIFICATE OF CORRECTION

PATENT NO. : 6,575,022 B1
DATED : June 10, 2003
INVENTOR(S) : Schneider et al.

It is certified that error appears in the above-identified patent and that said Letters Patent is hereby corrected as shown below:

Title page,
Item [63], Related U.S. Application Data, please replace "...which is a continuation-in-part of application No. 08/564,429, filed on November 29, 1995, now Pat. No. 5,686,868." with -- which is a continuation-in-part of application No. 08/564,419, filed on November 25, 1995, now abandoned. --

Signed and Sealed this

Twenty-sixth Day of July, 2005

JON W. DUDAS
*Director of the United States Patent and Trademark Office*